United States Patent [19]

Tufano et al.

[11] Patent Number: 5,075,782
[45] Date of Patent: Dec. 24, 1991

[54] REPRODUCTION APPARATUS OPERATION DURING MALFUNCTION RECOVERY

[75] Inventors: Charles M. Tufano, Rochester; Russell L. Godshalk, Hilton; David R. Hansen, Honeoye Falls, all of N.Y.

[73] Assignee: Eastman Kodak Company, Rochester, N.Y.

[21] Appl. No.: 415,935

[22] Filed: Oct. 2, 1989

[51] Int. Cl.[5] .............................................. H04N 1/00
[52] U.S. Cl. .................................... 358/437; 358/403; 358/444
[58] Field of Search ............... 358/403, 404, 405, 434, 358/444, 437, 471, 445, 447

[56] References Cited

U.S. PATENT DOCUMENTS 4,774,591 9/1988 Matsunawa et al. ................. 358/444
4,907,094 3/1990 Mishima et al. ..................... 358/404

FOREIGN PATENT DOCUMENTS 1531401 11/1978 United Kingdom .

Primary Examiner—Jin F. Ng
Assistant Examiner—Thomas D. Lee
Attorney, Agent, or Firm—Milton S. Sales

[57] ABSTRACT

Reproduction apparatus is disclosed having at least one image signal generator, a multiple page buffer memory for storing the image signals, and a writer for forming images from the page buffer memory. Upon the occurrence of a malfunction in the writer, operation of the image signal generator is continued only until the first to occur of (a) all of the original pages have been stored in the multiple page buffer memory or (b) the multiple page buffer memory is filled. Upon the occurrence of a malfunction in the signal generator, operation of the writer is continued until the next page to be written has not been stored in the buffer memory.

3 Claims, 2 Drawing Sheets

REPRODUCTION APPARATUS OPERATION DURING MALFUNCTION RECOVERY

BACKGROUND OF THE INVENTION

1. Technical Field

This invention relates generally to document reproduction apparatus, and more particularly to operation of the apparatus during recovery from a malfunction.

2. Background Art

Various types of system shut downs during malfunctions are known in the prior art. Generally, reproduction apparatus is put through either a so called "soft" or a "hard" shut down sequences. In a hard sequence, the machine essentially stops the production at the time of malfunction. In a soft sequence, reproductions in progress continue through the apparatus, but new reproductions are not started.

Parts of the machine may be subjected to a soft shut down and other parts to a hard shut down. For example, a copier having a recirculating document feeder experiencing a jam in the marking engine may effect a hard shut down of the engine and a soft shut down of the feeder. If the jam is in the feeder, the engine may carry out a soft shut down and the feeder a hard shut down. Regardless of whether the shut down is soft or hard, production ceases upon detection of the malfunction.

Reproduction apparatus is known in which a plurality of reproductions of a multiple page original can by made such that the reproduction pages are arranged in a collated sequence. In optical copiers, this has been accomplished by recirculating the original pages as often as necessary to produce the desired number of copy sets, or by means of mechanical sorters.

It is also known to do the collation by means of an electronic multiple page buffer memory into which electronic signals representative of the image content of a plurality of original pages are written; to be subsequently read from memory in a predetermined page sequence to produce a plurality of reproductions of the multiple page original in collated sequence. Such apparatus is described in commonly assigned British Patent Specification 1,531,401 published on Nov. 8, 1978.

It would be desirable to provide a sophisticated and efficient automatic malfunction recovery system that maximizes the operator's opportunities to use the apparatus for production during the recovery process.

DISCLOSURE OF INVENTION

It is an object of the present invention to provide for the efficient operation of reproduction during malfunction recovery while maintaining the integrity of a run in progress such that the run progresses as much as possible during the recovery operation.

In according with the above object, reproduction apparatus includes image signal generating means, a multiple page buffer memory for storing the electrical signals, and a writer for forming images from the page buffer memory on receivers. Upon the occurrence of a malfunction in the writer, operation of the image signal generating means is continued only until the first to occur of (a) all of the original pages have been stored in the multiple page buffer memory or (b) the multiple page buffer memory is filled. Upon the occurrence of a malfunction in the signal generating means, operation of the writer is continued until the next page to be written has not been stored in the buffer memory.

The invention, and its objects and advantages, will become more apparent in the detailed description of the preferred embodiments presented below.

BRIEF DESCRIPTION OF THE DRAWINGS

In the detailed description of the preferred embodiments of the invention presented below, reference is made to the accompanying drawings, in which.

BEST MODE FOR CARRYING OUT THE INVENTION

The present description will be directed in particular to elements forming part of, or cooperating more directly with, apparatus in accordance with the present invention. It is to be understood that elements not specifically shown or described may take various forms well known to those skilled in the art.

In this specification, the term "copier" is meant to refer to apparatus arranged for reading the image information on an original hard copy and for reproducing such image information on a receiver sheet. The term "printer" is meant to refer to apparatus arranged for receiving image information in other than hard copy form and for reproducing such image information on a receiver sheet. The term "original" is meant to refer to image information to be reproduced, whether such image information is in hard copy, electronic, or other form. The term "reproduction apparatus" is meant to refer to copiers and/or printers.

Figure 1:
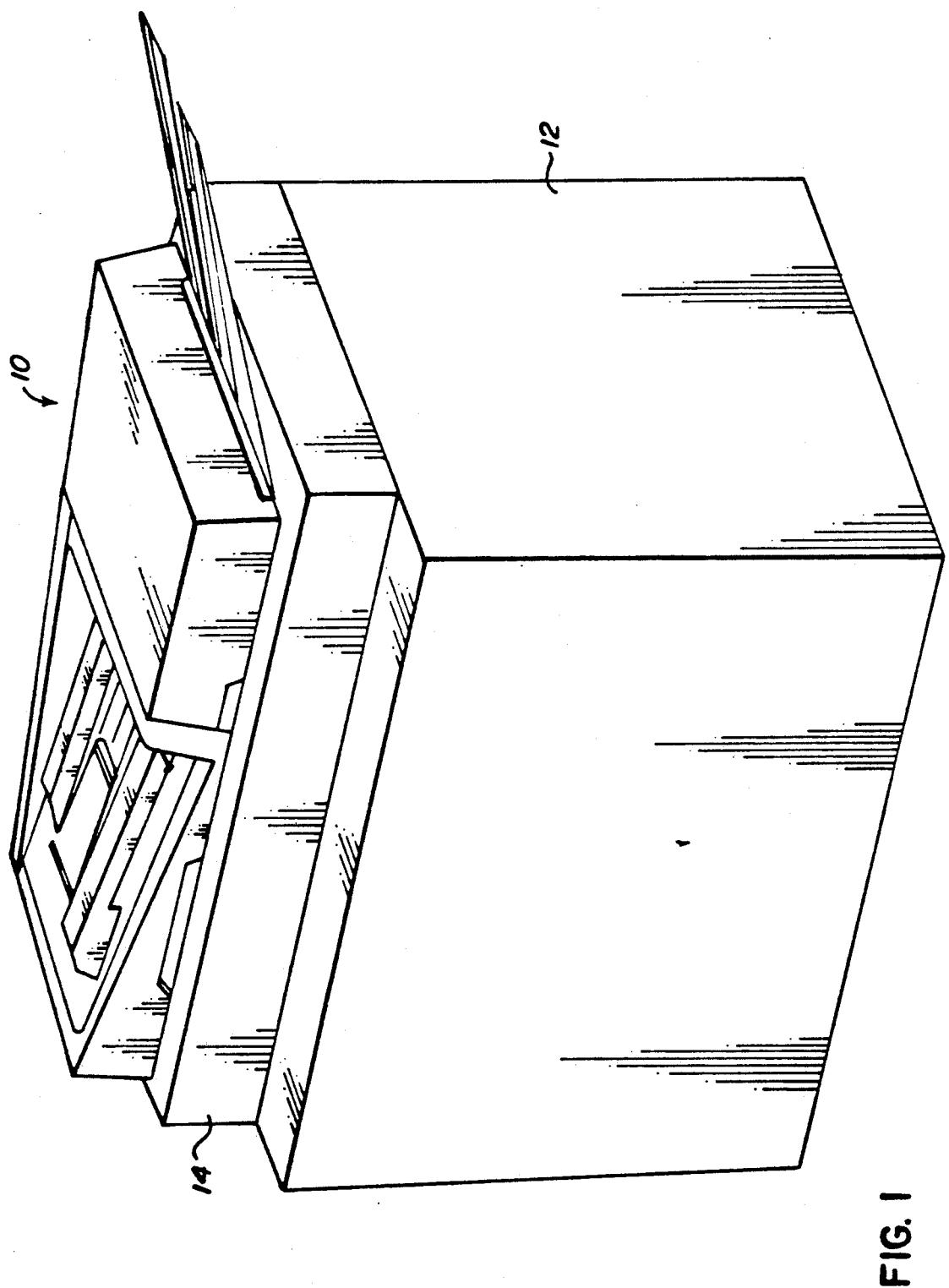
FIG. 1 is a perspective view of reproduction apparatus according to the present invention.
Figure 2:
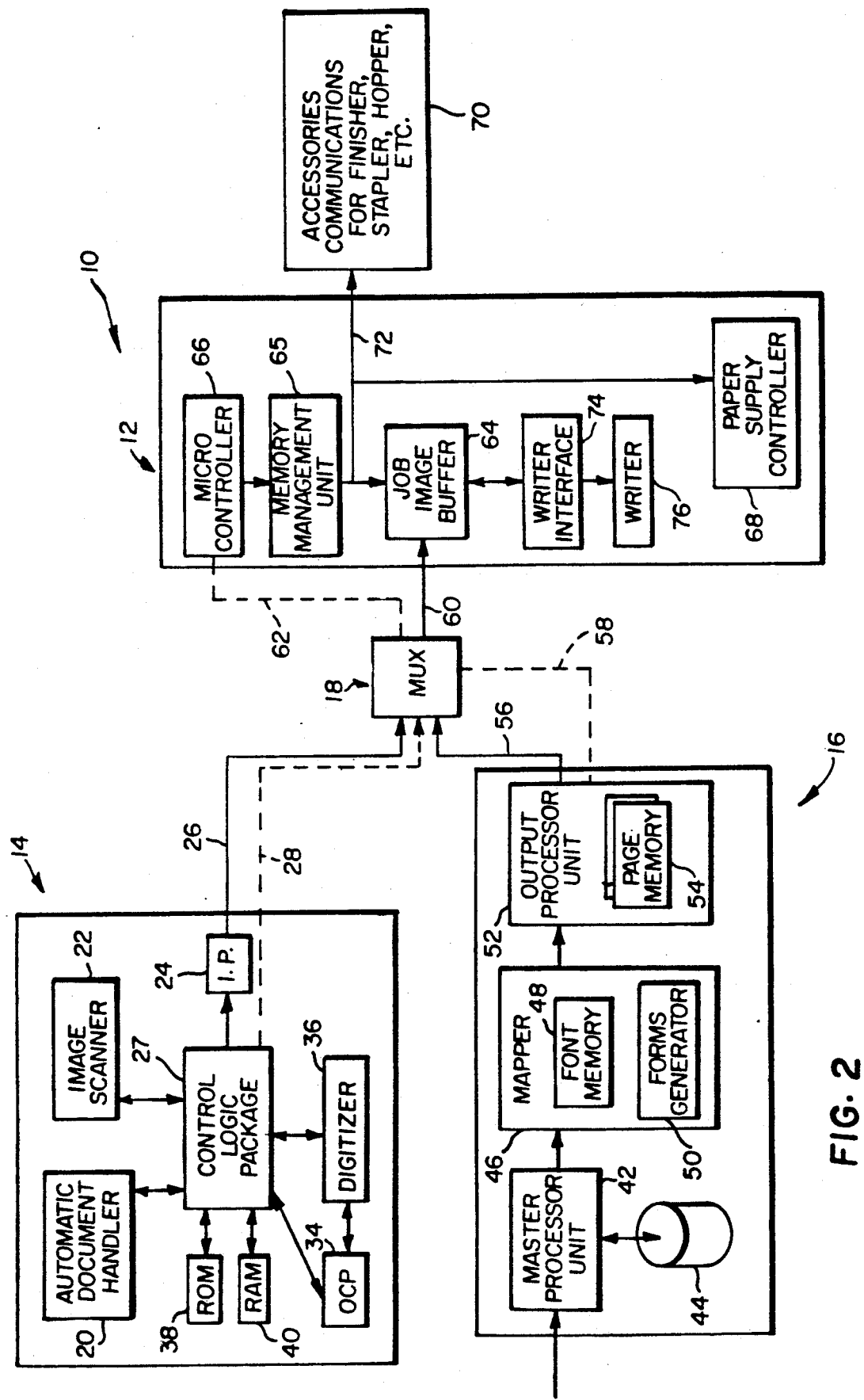
FIG. 2 is a schematic block diagram of reproduction apparatus of FIG. 1.

According to FIGS. 1 and 2, reproduction apparatus 10 includes a marking engine 12, a scanner 14, a raster image processor 16, and a multiple input controller 18 for selecting the input to the marking engine.

A document reader such as a scanner 14 is arranged for producing a series of electrical signals representative of the image content of originals. Scanner 14 consists of an automatic document handler 20 for stream feeding multiple hard copy original pages to be automatically read by an image scanner 22 such as a linear array of solid-state charge-coupled devices. The solid state device scans the original pages, converting their images to a series of electrical signals in page format for input to marking engine 12. The image data may be manipulated by image processing electronics 24. Image processing by electronics 24 may include linearity correction, unsharp masking, image editing, windowing, document recognition, magnification, accent color, color substitution, and so on. The processed image data is transmitted along an image data bus 26 to multiple input controller 18. Synchronization signals to identify separate scan lines and to provide page information and marking engine control is transmitted along a job control communications link 28.

Scanner 14 also includes a control logic package 27 having an operator control panel 34 and digitizer 36. The control logic package is an interfacing medium for the operator to input functions and to receive messages from the reproduction apparatus. Setup instructions are input to the scanner, while information for finishing and processing of jobs will be sent to marking engine 12. The logic package consists of control software, interface software, and logic hardware.

As way of example only, functions inputted by the operator at the control panel may include image editing features such as area erase (blanking and framing), image shift, book copy modes, magnification, positive-to-negative image reversal, accent (spot) color, highlighting, forms overlay, screening selected areas for breaking a continuous tone original into dots for reproduction as half-tone images, etc.

Default machine setup instructions are stored in a ROM 38. In the copier mode, an operator uses control panel 34 and digitizer 36 to input setup instruction values for storage in a RAM 40. Alternatively, setup instructions may be received via removable memory media from an off line computer, or the like. The setup instructions are used by image processing electronics 24 to modify the image data from image scanner 22, or are transmitted as control signals to marking engine 12.

Raster image processor 16 includes a master processor unit 42 which receives high level commands and data in character code form from a main frame computer, network link, data processing work station, removable memory media, FAX, or the like. The commands are translated into machine control language by the master processing unit. A job buffer 44 stores incoming jobs and program codes for use by the master processing unit.

After interpreting a job, master processing unit 42 parcels the job to a mapper 46, which includes a font memory 48 for converting the character code data to a pixel pattern map. For color prints, the mapper separates the information into four raster patterns; one for each color available at marking engine 12. Mapper 46 may provide for character block moves, line drawing, trapezoidal fills, and windowing/clipping. It also includes a forms generator 50.

When the pixel pattern map is rasterized, mapper 46 sends page information to an output processor unit 52. The output processor unit has page memory 54, which stores image planes for transmission to marking engine 12. Preferably, there are two image plane stores so that one store can be loaded while the other is being read to the marking engine. For use in a four color printer, one might want to provide eight image plane stores so that two four-color pages can be stored.

The processed image data is transmitted along an image data bus 56 to multiple input controller 18. Syncronization signals to identify separate scan lines and to provide page information and marking engine control is transmitted along a job control communications link 58.

Marking engine 12 receives bit stream image data over a bus 60 and job control data over a communications link 62, both for storage in a multiple page buffer memory 64 under the control of a memory management unit 65. Memory devices may be classified as being either "totally accessible" wherein simultaneous requests for access to two different addresses can be honored, or "not totally accessible" wherein only those addresses in a particular subset can be accessed at the same time. In the embodiment of reproduction apparatus as disclosed herein, the file maintenance problem is not solvable if only one "not totally accessible" memory is used since in normal operation the scanner (or the raster image processor) and the writer will generally not be working out of the same subset. Accordingly, job image buffer should preferably consist of two or more "not totally accessible" memories or at least one "totally accessible" memory.

Control means, including a micro controller 66 is arranged to perform arithmetic and logic operations and instruction decoding as well as controlling the time allocation of peripherals (such as a paper supply controller 68 and accessories 70) through a machine control communications link 72. Several output functions may be available for receiver sheets, including selection of output trays, stapling, sorting, folding, finishing, mailbox, envelope receiver, etc.

After appropriate processing, the data is inputted to a writer interface 74 and a writer 76 for forming images on the receiver sheets.

As an example of the functions of the elements so far described, it will be assumed that an operator desires to make eight collated sets of copies of an original made up of, say, twenty pages stacked in automatic document handler 20. The operator sets control panel 34 accordingly. For purposes of this example, it will further be assumed that job image buffer 64 is fully capable of storing the information from at least the twenty original pages.

Now, control logic package 30 starts in a subroutine pre-programmed according to the switches on control panel 34 to command scanner 14 to begin operation. Automatic document handler 20 is activated to move a document into an exposure station of image scanner 22.

As the scanning progresses, data (including image information and control signals) are received by job image buffer 64. As subsequent original documents are scanned, the processes described above are repeated until all of the original documents have been scanned and the data therefrom stored in job image buffer 64. Because job image buffer 64 is totally accessible (or there are two or more not totally accessible buffers), data can be removed from job image buffer 64 and transmitted to the writer at the same time that data is being written to the buffer.

Micro controller 65 is pre-programmed with the capacity of job image buffer 64 and with a bookkeeping function to keep track of the data loaded into the memory. Document scanning will be interrupted if the job image buffer is full.

One function of multiple-page image buffer 64 is to store all the pages of a particular job so that plural sets of collated pages may be produced without re-scanning the set of originals for each set produced. As such, automatic document handler 20 need not be capable of recirculating the original, but the present invention extends as well to reproduction apparatus having recirculating document handlers.

Even the best designed, operated, and maintained machine can malfunction from time to time. In reproduction apparatus, malfunctions occur, for example, due to paper jams, shortage of supplies such as image developer or receiver sheets, out of specification performance, etc. In prior art reproduction apparatus, a malfunction either in the portion of the apparatus that generates the signals representative of the image to be reproduced or in the writer portion of the apparatus has caused the shut down of the entire reproduction apparatus.

By the present invention, scanner 14 or raster image processor 16 sends image data and job processing instructions to marking engine 12, where the data and instructions are stored. Once the instructions and at least one page of image data has reached job image buffer 64, the writer begins production; reading data from buffer as needed.

Generally, there will be a plurality of pages stored in the buffer; either because the writer can not keep up with the rate that data is sent to it, or a plurality of sets of a multiple page original has been requested. Therefore, a malfunction in the scanner or raster image processor such that there is an interruption in the information flow to the marking engine does not necessarily shut down the operation of the marking engine. That is, upon a malfunction of the signal generating means, operation of the writer means can continue until the next page in the production sequence has not been stored in the buffer. As such, the writer continues to produce while the malfunction is corrected; greatly enhancing productivity of the system.

In a similar manner, a malfunction in the marking engine such that there is an interruption in the writer's ability to produce output does not necessarily shut down the operation of scanner 14 or raster image processor. That is, upon a malfunction of the writer means, operation of the signal generating means can continue until either the entire multiple page original is stored in job image buffer 64, or the buffer becomes full. Thus, the signal generating means continues to store data in buffer while the malfunction is corrected; also enhancing productivity of the system.

The invention has been described in detail with particular reference to preferred embodiments thereof, but it will be understood that variations and modifications can be effected within the spirit and scope of the invention.

What is claimed is:

1. Reproduction apparatus for multiple page originals, said apparatus comprising:
   A. means for generating a series of electrical signals representative of the image content of a plurality of original pages;
   B. an electronic multiple page buffer memory for receiving and storing such a series of electrical signals;
   C. means for writing such a series of electrical signals to said memory;
   D. writer means responsive to applied electrical signals for forming images on receiver sheets;
   E. a processing unit for reading stored signals from the multiple page buffer memory in a predetermined page sequence, and for applying such signals to said writer means; and
   F. means, operative upon the occurrence of a malfunction in one of said signal generating means and said writer means for:
      1) upon malfunction of said writer means, continuing operation of said signal generating means only until the first to occur of (a) all of the original pages have been stored in said multiple page buffer memory or (b) said multiple page buffer memory is filled, and
      2) upon malfunction of said signal generating means, continuing operation of said writer means until the writer is ready to form images of a page in the predetermined sequence which page has not yet been stored in said buffer memory.

2. Reproduction apparatus for multiple page originals, said apparatus comprising:
   A. means for generating a series of electrical signals representative of the image content of a plurality of original pages;
   B. an electronic multiple page buffer memory for receiving and storing such a series of electrical signals;
   C. means for writing such a series of electrical signals to said memory;
   D. writer means responsive to applied electrical signals for forming images on receiver sheets;
   E. a processing unit for reading stored signals from the multiple page buffer memory in a predetermined page sequence, and for applying only such read signals to said writer means; and
   F. means, operative upon the occurrence of a malfunction in said signal generating means for continuing operation of said writer means until the writer is ready to form images of a page in the predetermined sequence which page has not yet been stored in said buffer memory.

3. Reproduction apparatus for multiple page originals, said apparatus comprising:
   A. means for generating a series of electrical signals representative of the image content of a plurality of original pages;
   B. an electronic multiple page buffer memory for receiving and storing such a series of electrical signals;
   C. means for writing such a series of electrical signals to said memory;
   D. writer means responsive to applied electrical signals for forming images on receiver sheets;
   E. a processing unit for reading stored signals from the multiple page buffer memory in a predetermined page sequence, and for applying only such read signals to said writer means; and
   F. means, operative upon the occurrence of a malfunction in one of said signal generating means and said writer means for:
      1) upon malfunction of said writer means, continuing operation of said signal generating means only until the first to occur of (a) all of the original pages have been stored in said multiple page buffer memory or (b) said multiple page buffer memory is filled, and
      2) upon malfunction of said signal generating means, continuing operation of said writer means until the writer is ready to form images of a page in the predetermined sequence which page has not yet been stored in said buffer memory.

* * * * *